United States Patent [19]

Hildebrand

[11] 4,279,938

[45] Jul. 21, 1981

[54] PREPARATION OF BEVERAGES CONTAINING A HEAD OF FROTH

[75] Inventor: Peter C. R. Hildebrand, Dublin, Ireland

[73] Assignee: Arthur Guinness Son and Company, London, England

[21] Appl. No.: 35,426

[22] Filed: May 2, 1979

Related U.S. Application Data

[63] Continuation of Ser. No. 833,879, Sep. 16, 1977, abandoned.

[51] Int. Cl.$^3$ .................. C12C 11/00; A23L 2/00; C12H 1/00
[52] U.S. Cl. .................. 426/424; 426/592; 426/422; 426/397; 426/474; 426/477
[58] Field of Search .............. 426/238, 474, 475, 477, 426/592, 422, 397, 424

[56] References Cited

U.S. PATENT DOCUMENTS 2,267,744  12/1941  Nordquist .................. 53/428

FOREIGN PATENT DOCUMENTS 876628   9/1961  United Kingdom .
876629   9/1961  United Kingdom .
1266351  3/1972  United Kingdom .

*Primary Examiner*—David M. Naff
*Attorney, Agent, or Firm*—McCormick, Paulding & Huber

[57] ABSTRACT

Beverages such as beer in a sealed conventional bottle or can for individual consumption are provided with a head of froth after the can or bottle is opened by subjecting the beverage to an excitation treatment that causes gases dissolved in the beverage to come out of solution and form a head of froth having small uniform bubbles throughout. The gases dissolved in the beverage are carbon dioxide and nitrogen in amounts of 0.8 to 1.8 vols./vol. and 0.015 to 0.035 vols./vol., respectively. Excitation is performed by injecting liquid and/or foam into the beverage or by passing the beverage through a bed of small discrete sharp edge polystyrene granules.

7 Claims, 5 Drawing Figures

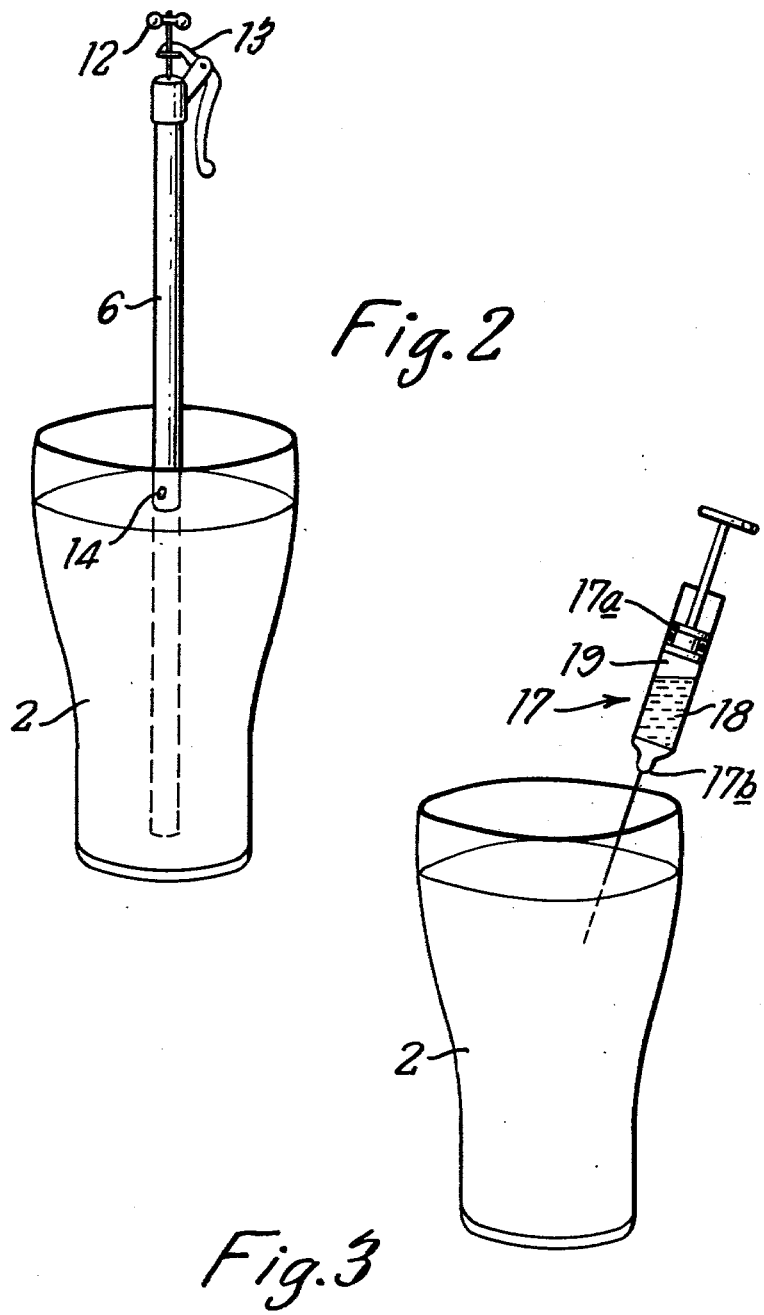

PREPARATION OF BEVERAGES CONTAINING A HEAD OF FROTH

This application is a continuation of application Ser. No. 833,879 filed Sept. 16, 1977, now abandoned.

This invention relates to the preparation of beverages containing gas in solution and is particularly concerned with the formation, during such preparation, of a head of froth on the beverage.

According to the present invention there is provided a method of preparing and serving a beverage having a head of froth which includes the steps of forming a sealed package (as hereinafter defined) of the beverage in which the beverage has in solution therewith an inert gas (as hereinafter defined) and/or carbon dioxide gas; opening the sealed package and subjecting the beverage to an excitation medium (as hereinafter defined) to an extent and for a time sufficient to cause some of the said inert gas and/or carbon dioxide gas to come out of solution and cause or contribute to the formation of the head of froth.

Further according to the present invention there is provided, as a vehicle product, a beverage provided in a drinking vessel and having a head of froth thereon, said beverage having been dispensed by manual pouring into the drinking vessel from, and subsequent to, the opening of a sealed package (as hereinafter defined) in which the beverage was contained with an inert gas (as hereinafter defined) and/or carbon dioxide gas in solution therewith, the beverage having been subjected, subsequent to the opening of the sealed package, to stimulation by an excitation medium (as hereinafter defined) so that at least part of the inert gas and/or carbon dioxide gas comes out of solution to form, or assist in the formation of, the head of froth.

Still further according to the present invention there is provided a method of providing a vendible beverage from a sealed package (as hereinafter defined) in which the beverage is retained with an inert gas (as hereinafter defined) and/or carbon dioxide gas in solution therewith and which comprises opening the sealed package, and subjecting the beverage to an excitation medium (as hereinafter defined) to an extent sufficient to cause some of the inert gas and/or carbon dioxide gas to come out of solution and cause or contribute to the formation of a head of froth on the beverage.

By "inert gas" as used throughout this Specification (which includes the appended claims) is meant a gas other than carbon dioxide with the following properties
(i) it does not itself react chemically with the beverage (particularly with fermentated liquor);
(ii) when applied to, or dissolved in, the beverage it does not promote or develop bacteriological reactions;
(iii) as compared with carbon dioxide:
  (a) it is relatively insoluble in fermented liquor such as beer, e.g. in the order of less than 0.05 vol./vol. as compared with 100%;
  (b) it does not have a large effect on the size of head of froth for a given pressure change of dissolved gases ("size of head " being the volume of froth initially present on the top of the beverage in an open topped vessel after the beverage has been dispensed into the vessel and the head has been formed);
(iv) it is not harmful to the consumer;
(v) it does not impair the normal taste of the beverage.

Preferably the inert gas is nitrogen having advantages that it is readily obtainable, generally inexpensive and is non-inflammable. An example of another gas which may be considered suitable for the purpose of the present invention is argon.

By the phrase "sealed package" as used throughout this Specification (which includes the appended claims) is meant a container such as a bottle or can in which a relatively small quantity of the beverage is sealed from atmosphere (as compared with a bulk quantity container such as a beer keg) and by which the beverage may be transported, shelf stored and dispensed into a drinking vessel by manual pouring directly from the container.

By the phrase "excitation medium" as used throughout this Specification (which includes the appended claims) is meant at least one of the following:
(a) liquid and/or foam flow through the beverage by injection of such liquid and/or foam into the beverage, the source of such flow being remote from the sealed package;
(b) an excitation surface the characteristics of which are chosen and/or which surface is processed to expose the beverage to nucleation sites capable of inducing foaming.

The liquid or foam as mentioned in (a) above is preferably that of, or derived from, the beverage which is retained in the package and the liquid can be supersaturated. A preferred form of excitation surface comprises polystyrene granules derived from a block of polystyrene which has been shattered in a mill or otherwise to produce sharp edges to the granules.

Each form of excitation medium mentioned in (a) above is preferably applied to the beverage while it is in an open topped vessel (having been manually poured into such vessel after opening of the sealed package), it can however be applied to the beverage while the latter is still in the package but after such package has been unsealed. The beverage is conveniently subjected to the excitation surface while it is being poured from the container to a drinking glass; for example, the beverage may be poured through a quantity (typically 10 grams) of shattered polystyrene granules which have been suitably supported while in the flow of beverage (an appropriate support may consist of a suitably constructed gauze cage containing the granules).

The present invention was primarily developed for use in the preparation of a beverage in the form of a fermented liquor such as beer, lager, ale or stout—however, the invention is also applicable to the preparation of non-fermented beverages having physico-chemical properties that can lead to the formation of a beer-type head of froth.

It is well known to provide a sealed package in which the beverage, be it either a fermented liquor or a "soft-drink" contains gas in solution—the gas being present either as a result of its injection into the beverage or as a result of the final stages of fermentation which may be allowed, or be intended, to take place in the sealed package. Hitherto the gas in beverages in sealed packages has been wholly or primarily of carbon dioxide so that upon opening of such a sealed package and dispensing of its contents, the beverage effervesces to form the head of froth as the carbon dioxide comes out of solution. In such a known sealed package it is usual that upon dispensing of the beverage the caarbon dioxide readily comes out of solution to form the head, usually without the beverage having to be externally excited or stimulated, for example by manual shaking of the package; in accordance with the present invention however release of the carbon dioxide from the beverage may be expedited by subjecting the beverage to stimulation by an excitation medium.

In comparison with the dispensing of beverages from sealed packages, the dispensing of a beverage, particularly stout or beer, in draught form from a bulk container is usually achieved by the application from an external supply of a pressurized gas (which is usually carbon dioxide or a mixture of carbon dioxide and nitrogen) to the bulk beverage. Consequently the draught beverage when being dispensed can contain nitrogen in solution as a mixture with carbon dioxide (the latter being present at a lower level than is normally encountered in that beverage when contained in a sealed package). This is considered to be most advantageous since it enables a smaller size of bubble to be formed (in comparison with such bubble as would be formed by carbon dioxide alone) without releasing too much gas. By reducing the bubble size in the froth there becomes a relatively greater surface area of surface active compounds and a greater density to the froth so that perceived creaminess and persistance of the froth is relatively increased. This latter effect is considered particularly advantageous for stout where it is most desirable that the froth should persist and be of a creamy or foamy nature in comparison with the light froth as is conventionally provided on light beer or lager. To understand the development of the aforementioned creamy or foamy froth, it is first realized that a bubble forming part of that froth can only survive in the stout if its internal pressure is at least equal to the forces which are tending to make it collapse—particularly hydrostatic pressure and surface tension. The latter is inversely proportional to the radius of the bubble so that the smaller the bubble the greater must be its internal pressure to prevent it collapsing from surface tension. The maximum internal pressure of the bubble is the sum of the pressures necessary to retain the concentrations of the dissolved gases in solution—consequently to decrease the bubble size the pressures of the dissolved gases must be increased accordingly with the effect that more gas is dissolved. In the case of carbon dioxide the amount of gas dissolved quickly rises to a point of producing an unmanageable amount of froth on the beverage. For this reason the nitrogen (or other inert gas) is introduced since it has a much lower solubility than carbon dioxide and it thus becomes possible to obtain a significant increase in the pressures of the dissolved gas without an unacceptable increase in the volume of dissolved gases.

During the dispensing of draught beverage as aforementioned containing nitrogen in solution (or other inert gas in solution and possibly mixed with carbon dioxide as discussed in our British Pat. No. 876,628) the beverage is processed in a manner which is particularly intended to release the nitrogen and carbon dioxide from solution to promote the formation of very small bubbles of nitrogen and carbon dioxide which will form a creamy froth. Such processing of the draught beverage to release the nitrogen and carbon dioxide from solution is necessary to produce the very small bubbles and assist the evolution of carbon dioxide. Conventionally the nitrogen and carbon dioxide release and the formation of very small enduring bubbles is achieved by the draught beverage being subjected to cavitation as it suffers a pressure drop in passing through an array of small orifices in a plate located upstream or downstream of the dispensing tap.

The presence of a particular gas in solution influences, to a certain extent, the flavour characteristic of a beverage when dispensed and the head of froth formed. This is particularly true of stout where there is a major difference in quality between stout with a carbon dioxide content above 2.0 vols./vol. of beer as dispensed from a sealed package such as a can or bottle (where the head is predominantly formed by release of carbon dioxide) and similar stout containing dissolved nitrogen dioxide and with a carbon dioxide content in the range of 0.8 to 1.8 vols./vol. of beer when dispensed in draught form from a keg pressurized with nitrogen and carbon dioxide (where the head formation is assisted by nitrogen release). For the avoidance of doubt the units "vols./vol." as used throughout this Specification are the number of volumes of gas which are dissolved in a unit volume of the beverage, said volumes of gas being determined at a pressure of 760 millimeters of mercury and at a temperature of 15.6° C. The aforementioned difference in quality is particularly noticeable in the case of the foam. In the latter—draught—case the foam is more creamy which can be objectively measured by a high foam density. It may be undesirable that it has not, until now, been possible to produce from conventional sealed containers such as bottles or cans a beverage with characteristics of draught stout. The present invention was therefore developed in an attempt to alleviate the aforementioned difficulty whereby a customer purchasing a beverage dispensed from a sealed package could expect such beverage to have substantially the same flavour and appearance characteristics as if that beverage had been dispensed in draught form from bulk containers by carbon dioxide and/or nitrogen or other inert gas under pressure.

In a preferred form of the present invention therefore stout in a sealed package is charged with nitrogen (or other inert gas) so that the nitrogen and carbon dioxide (the carbon dioxide usually being at a lower level than is normally encountered in wholly carbonated bottles or canned beverages and typically in the range of 0.8 to 1.8 vols./vol.) is caused to come out of solution, at least in part to form or contribute to the formation of, a head of froth on the stout as a result of the stout being subjected to stimulation by an excitation medium.

Embodiments of the present invention will now be described, by way of example only, with reference to the accompanying illustrative drawings, in which:

FIG. 2 illustrates the manner in which the device of FIG. 1 can be used;

FIG. 3 shows use of a syringe device for achieving stimulation of the beverage to provide froth formation;

Each of the examples discussed hereinafter for putting the present invention into effect will be considered in relation to the preparation and serving of stout from a sealed bottle or can, such stout in the bottle or can having in solution therewith a mixture of nitrogen and carbon dioxide, the former being present typically in the range 0.015 to 0.035 vols./vol. and the carbon dioxide being present at a considerably lower level than the amount of carbon dioxide which would normally be present in conventionally bottled or canned stout and typically in the range of 0.8 to 1.8 vols./vol.

Figure 1:
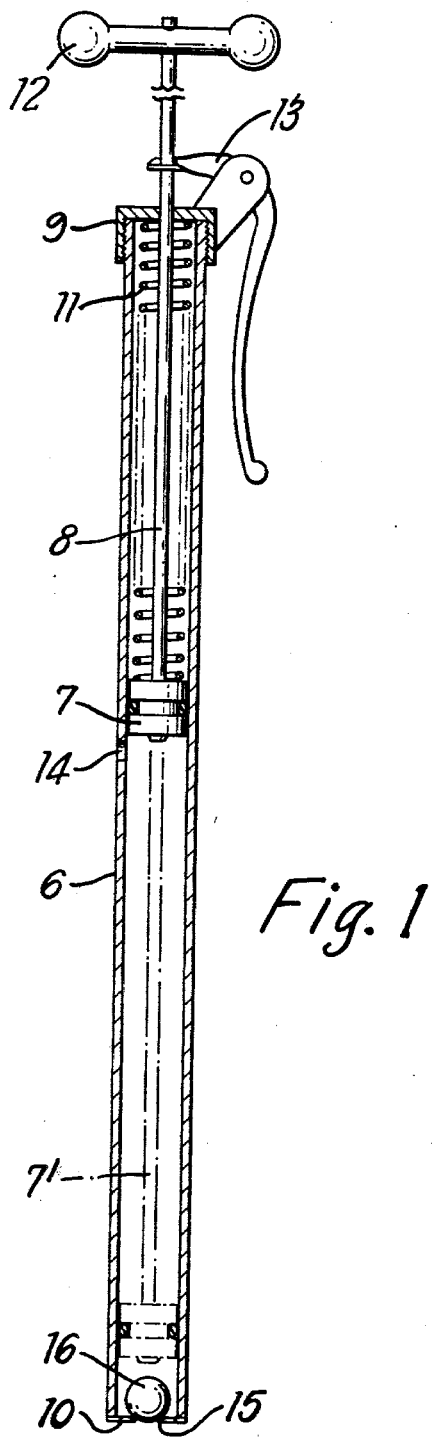
FIG. 1 is a cross section through an injector device by which a supersaturated liquid can be injected into the beverage to provide the necessary stimulation for froth formation.

The injector device shown in FIG. 1 comprises a cylindrical tube 6 within which is axially slidable a piston 7. Attached to the piston 7 is a piston rod 8 which slidably extends through a cap 9 at the upper end of the tube. The piston 7 is biased downwardly towards a nozzle 10 at the lower end of the tube by a helical spring 11 which reacts against the end cap 9. The piston 7 can be axially withdrawn manually against the biasing of spring 11 by a handle 12 on the piston rod until the rod 8 engages a catch mechanism 13 which retains the device in a "cocked" condition. In this latter condition the piston 7 clears an aperture 14 which is located in the tube 6 between the piston (when cocked) and the nozzle 10. The nozzle 10 has an outlet orifice 15 within which is normally seated a ball valve member 16, furthermore the periphery of the orifice 15 is provided with a circumferentially spaced array of small grooves (not shown) so that when the ball is seated in the orifice 15 small "cavitation" chanels are formed between the grooves and the surface of the ball 16 and which channels communicate between the lower inner chamber of the injection device and the outside of the nozzle.

After opening of a bottle or can of the stout, the stout is poured into a drinking glass 2. To cause the head to form on the stout by the device shown in FIG. 1, the nozzle end, and part length of the tube 6, is inserted into the stout in the glass (and while the device is in a cocked condition) so that the aperture 14 remains clear of the stout (see FIG. 2). The ball member 16 is lifted slightly from the orifice 15 (by static pressure of the stout) and the lower chamber of the device partly fills with the stout (which is regarded as a supersaturated liquid). The catch mechanism 13 is released when the stout levels in the tube 6 and in the glass 2 have equalised so causing the piston 7 to be driven downwardly (as indicated at 7' in FIG. 1) by the pressure of spring 11; consequently the increased pressure on the stout in the injection device urges the ball 16 on to its seating and displaces the stout from the ejector device into the stout in the glass by way of the cavitation channels. In passing through the cavitation channels the stout is subjected to cavitation and gas therein comes out of solution and this acts to initiate and encourage evolution of the dissolved gases from the stout in the glass by "seeding" the formation of further fine bubbles in the stout (as discussed in British Pat. No. 1,266,351) to form the head.

The stout as poured into the glass 2 can be subjected to the necessary excitation medium by use of a syringe device 17 shown in FIG. 3 whereby the nozzle 17b of the syringe is dipped into the stout in the glass 2 and stout is drawn under vacuum by movement of the plunger 17a in to the syringe chamber—this has the effect of subjecting the stout to cavitation as it enters the syringe chamber through the nozzle and consequently the stout in the chamber foams in the headspace of the syringe chamber. The stout and foam are now injected from the syringe back into the glass (while the nozzle 17b is submerged in the stout) and the injection of such foam initiates and encourages evolution of the dissolved gases by "seeding" to form the head as previously discussed.

In each of the aforementioned examples of putting the invention into effect, the stout is subjected to the excitation medium after it has been poured into and while it is in, the drinking glass 2. If required each such method may be modified by subjecting the stout to the excitation medium while it is still in the bottle or can (but after opening of such bottle or can) so that the desired foam or liquid can be injected into the stout in the bottle or can to cause the aforementioned "seeding" effect on the stout. It is of course desirable that sufficient headspace is provided in the can or bottle to allow the creamy froth to begin to develop immediately prior to pouring the beverage into the drinking glass.

Figures 4, 5:
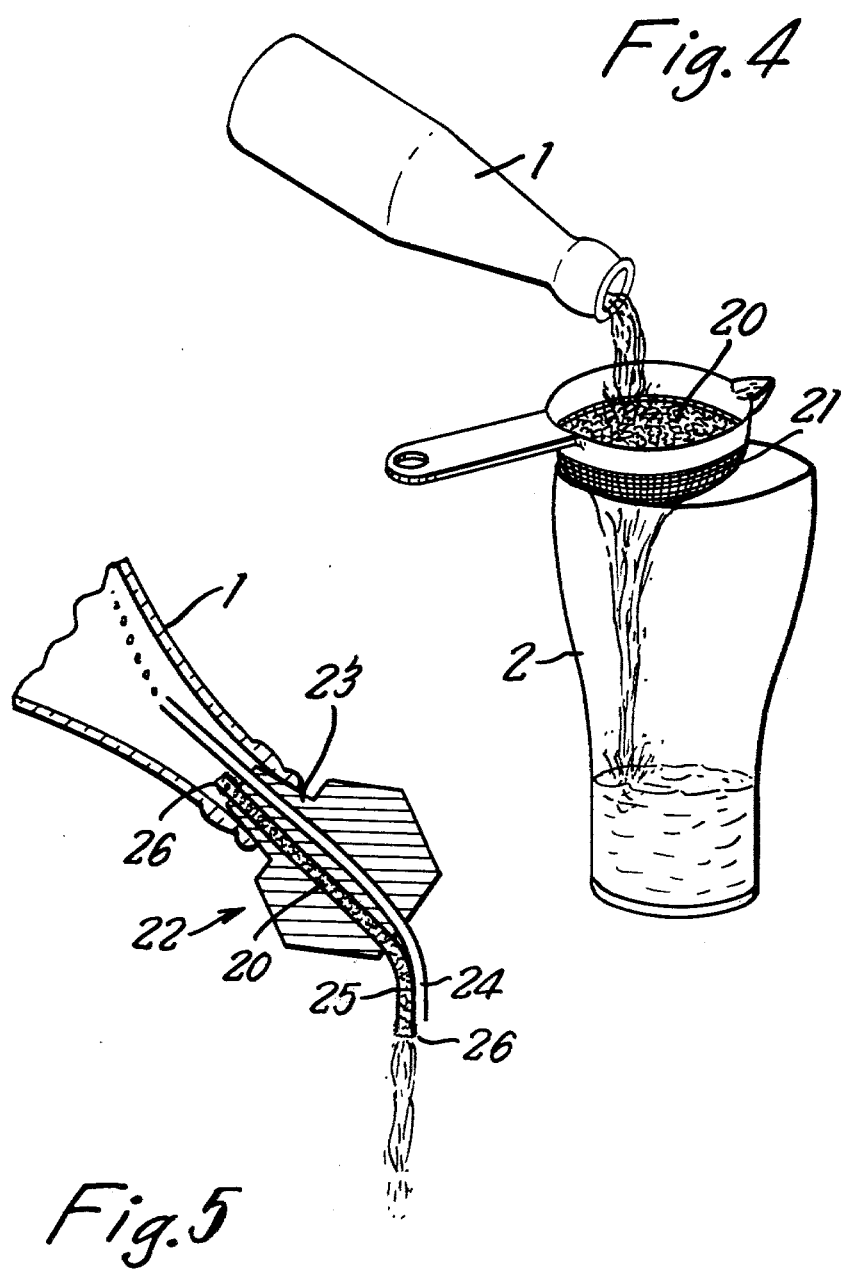
FIG. 4 shows an arrangement by which the beverage can be subjected to an excitation surface to provide the necessary stimulation for froth formation.
FIG. 5 illustrates a dispensing device for attachment to a bottle so that during pouring of beverage therefrom the beverage is subjected to an excitation surface.

By the present invention a head of creamy froth can be formed on the stout derived from a bottle 1 by pouring such stout over a surface which has nucleation sites capable of inducing foaming and in the embodiment shown in FIG. 4 the stout is poured from the bottle over polystyrene granules 20 (which are retained in a simple gauze container of strainer 21) and into the glass 2. The granules 20 are conveniently formed by shattering a block of polystyrene in a mill and it is believed to be the flow of stout over the nucleation sites provided by the sharp peaks on the surface of such granules which causes evolution of the gases in the stout to promote the head formation. FIG. 5 illustrates a dispensing device 22 having a stopper portion 23 which engages within the mouth of the bottle 1 of stout. Extending through the body of the device 22 and into the bottle 1 are two tubes 24 and 25 of which tube 24 is for the admission of air into the bottle during pouring of stout from the bottle through tube 25. It will be noted that tube 24 enters deeper into the bottle than tube 25 so the liquid pressure differential will ensure the stout flows through the tube 25 rather than through the tube 24.

Housed within the tube 25 are polystyrene granules 20 which are retained in the tube by gauze caps 26 on the ends of the tube; consequently as the stout is poured into the glass through tube 25 is flows over the surface of granules 20 which causes evolution of the gases in the stout and formation of the head foam.

I claim:

1. A method of preparing and serving a beverage which includes the steps of forming a sealed container selected from the group consisting of a conventional single-chambered bottle or can for individual consumption in which the beverage is sealed from the atmosphere and has in solution therewith nitrogen gas in the range of 0.015 to 0.035 vols./vol. and carbon dioxide gas in the range of 0.8 to 1.8 vols./vol., opening the sealed container and subjecting the beverage to excitation under atmospheric pressure to an extent and time necessary to cause some of each of said gases to come out of solution and cause the formation of a head of froth, said excitation comprising injecting a liquid under pressure supersaturated with a gas selected from the group consisting of nitrogen and carbon dioxide into the beverage in such a manner as to provide small gas seeding bubbles in the body of the liquid which initiate the evolution of gas from the main body of the beverage to form a head of froth characterized by small uniform bubbles throughout.

2. A method as claimed in claim 1 which comprises subjecting the beverage to excitation by injecting said liquid and pressurized foam, said liquid and foam being derived in small quantity from the beverage.

3. A method as claimed in claim 1 in which said liquid is derived from the beverage.

4. A method as claimed in claim 1 which comprises subjecting the beverage to excitation while said beverage is retained in the opened container.

5. A method as claimed in claim 1 which comprises subjecting the beverage to excitation while said beverage is located in an open topped vessel into which it was poured from the container.

6. A method of preparing and serving a beverage which includes the steps of forming a sealed container selected from the group consisting of a conventional single-chambered bottle or can for individual consumption in which the beverage is sealed from the atmosphere and has in solution therewith nitrogen gas in the range of 0.015 to 0.035 vols./vol. and carbon dioxide gas in the range 0.8 to 1.8 vols./vol., opening the sealed container and subjecting the beverage to excitation under atmospheric pressure to an extent and time necessary to cause some of each of said gases to come out of said solution and cause the formation of a head of froth, said excitation comprising passing the beverage through a bed of small discrete sharp edge polystyrene granules to form a head of froth characterized by small uniform bubbles throughout.

7. A method as claimed in claim 6 in which the beverage is subjected to said excitation while the beverage is being poured from the container into an open topped vessel.

* * * * *